Patented Jan. 30, 1940

2,188,882

UNITED STATES PATENT OFFICE 2,188,882

CONDENSATION PRODUCT AND METHOD

Edwin T. Clocker, Fountain Hill, Pa.

No Drawing. Application December 24, 1934,
Serial No. 759,086

34 Claims. (Cl. 260—405)

My invention relates to methods of producing an improved condensation product suitable for use in resins, lacquers, paints, varnishes, enamels, metallic coatings, plastic masses, dispersing, wetting and softening agents, and for other similar purposes, and to the new product so produced. My invention also relates to the new methods of dispersing, and the like.

Subject matter at one time included in the present application is now included in several copending applications. Serial No. 117,243, filed December 22, 1936, for Condensation product and method, relates to maleic acid and similar dicarboxylic acids. Serial No. 165,898, filed September 27, 1937, for Condensation product and method, relates to salts and esters of the condensation product generally and water soluble salts specifically. Serial No. 165,899, filed September 27, 1937, for Condensation product and method, includes the subject matter relating to recondensation. Serial No. 165,900, filed September 27, 1937, for Coating composition and method, is concerned particularly with coating. Serial No. 231,759, filed September 26, 1938, for Condensation product and method, is directed to reaction products with a basic dye. Serial No. 231,760, filed September 26, 1938, for Condensation product and method, relates to water insoluble metallic salts. Serial No. 231,761, filed September 26, 1938, for Oily dispersion material, covers oils, fats and waxes emulsified by the condensation product of the invention. Serial No. 235,252, filed October 15, 1938, for Condensation product and method, is directed to condensation with oleic acid and its compounds.

A purpose of my invention is to produce an improved condensation product by causing condensation between one of the first group consisting of acyclic olefinic acids having less than ten carbon atoms in their carbon chains, acid anhydrides thereof and esters of both, and one of the second group consisting of nonconjugated unsaturated nonhydroxylated aliphatic acids having from ten to twenty-four carbon atoms in the carbon chains; nonhydroxylated salts thereof; nonhydroxylated esters thereof or similar compounds. As explained below, any relatively short chain compound containing the ethylene linkage in condensable form may be condensed with any nonconjugated unsaturated nonhydroxylated aliphatic acid or the like having from ten to twenty-four carbon atoms in its carbon chain.

A further purpose is to cause a condensable ethylene type compound having less than ten carbon atoms in its carbon chain to attach to the carbon chain of a nonconjugated unsaturated nonhydroxylated fatty acid or the like by suitable application of heat and, desirably also, pressure. A temperature of between 150° C. and 300° C. is preferred for the reaction, 180° C. to 260° C. being the most satisfactory range. Good results are obtained using a temperature not less than 150 C. and in excess of the ordinary boiling point of the one of the first group with return condensation.

A further purpose is to cause one molecular equivalent of a condensable ethylene type compound having less than ten carbon atoms in its carbon chain to condense with one molecular equivalent of a nonconjugated unsaturated nonhydroxylated carbon chain compound having from ten to twenty-four carbon atoms in the chain.

A further purpose is to partially or completely saturate the double bonds of a nonconjugated unsaturated nonhydroxylated fatty acid, fatty oil or the like by one of the groups consisting of acyclic olefinic acids having less than ten carbon atoms in their carbon chains, acid anhydrides thereof and esters of both.

A further purpose is to condense maleic anhydride or the like with a drying oil such as linseed oil, and to cause the condensation product to dry in air at ordinary temperatures or at elevated temperatures, either in the presence of a drier or without a drier.

A further purpose is to produce my novel condensation product in a form which has a polar-reactive group.

A further purpose is to cause the acid or acid anhydride group of a condensation product of an acyclic olefinic acid or acid anhydride having less than ten carbon atoms in its carbon chain with a nonconjugated unsaturated nonhydroxylated fatty acid or the like having from ten to twenty-four carbon atoms in its carbon chain to react with other compounds, such as metal salts or metals.

A further purpose is to improve the mixing of oil with pigment, facilitate grinding of the pigment, and obtain better "leveling" properties in a paint by employing a condensation product of one of the group consisting of acyclic olefinic acids having less than ten carbon atoms in their carbon chains, acid anhydrides thereof and esters of both, and a nonconjugated unsaturated nonhydroxylated fatty oil as a vehicle or as an addition to other vehicles.

Further purposes appear in the specification and in the claims.

It has been known for some time that maleic anhydride or substances yielding maleic anhydride will condense with carbon chain compounds containing a conjugated system of double bonds. For example, Morrell, Marks and Samuels in British Patent No. 407,957 disclose a condensation of maleic anhydride with tung oil, a conjugated compound.

I have discovered that, under suitable conditions, maleic anhydride and compounds which behave similarly, as discussed below, will react with nonconjugated unsaturated nonhydroxylated fatty oils and acids and similar compounds having from ten to twenty-four carbon atoms in the carbon chain to produce a wide variety of products depending upon the characters of the reacting substances and the subsequent reactions to which the condensation products are subjected.

To produce the maleic condensation product, the maleic grouping must be present in condensable form, preferably as maleic anhydride. The condensation is of course obtained from any of the compounds which yield maleic anhydride, such as malic acid, fumaric acid or maleic acid. The production of maleic anhydride from such other acids is well known in the art (Bernthsen, Textbook of Organic Chemistry (1923) pages 250–256). Instead of maleic anhydride, an ester of maleic acid, whether an acid or completed ester, may be used; also a substituted maleic acid.

Whenever I refer herein to an acid or to an acid group I include an acid anhydride. I also include any dicarboxylic acid in which one carboxyl group is esterified but the other carboxyl group is still acidic. Whenever I refer to an ester, I also include partially completed esters such as half esters. When reference is made to polyhydric alcohols it is intended to include di-hydric alcohols.

Investigation of a large number of compounds has shown that condensation with a nonconjugated unsaturated nonhydroxylated aliphatic acid having from ten to twenty-four carbon atoms in the carbon chain is generally characteristic of chain compounds having the ethylene linkage and having less than ten carbon atoms in the carbon chains, which are substituted on one or both sides of the double bond to form acids or acid anhydrides, or esters or half esters thereof, or similar compounds. These compounds are olefinic as they are acyclic and have the ethylene linkage. Such olefinic compounds are mono-substituted when they contain only one acid, acid anhydride or esterified group; for example crotonic acid, vinyl acetate. Such olefinic compounds are di-substituted when they contain two acid, acid anhydride or esterified groups; for example maleic anhydride, citraconic anhydride, maleic acid, methyl maleate.

When I refer to the olefinic compound of less than ten carbon atoms in the carbon chain as having the ethylene linkage in condensable form, I mean to indicate that the compound is not a hydrocarbon, for example, but that it is an acid or acid anhydride, or an ester, or half ester thereof, or a similar compound which will condense with a nonconjugated unsaturated nonhydroxylated fatty acid or the like having from ten to twenty-four carbon atoms in the carbon chain.

The longer the carbon chain of the substituted olefinic acid or acid anhydride, or ester or half ester thereof, or similar compound, the less vigorous is the condensation reaction. Thus at the upper limit (nine carbon atoms in the carbon chain) the reaction is relatively mild. If there are less than seven carbon atoms in the carbon chain (for example six) the reaction is more vigorous. A still more vigorous reaction is obtained if there are less than five carbon atoms in the carbon chain. In the case of an ester of an olefinic compound, the carbon chain of the olefinic compound should have less than ten carbon atoms.

In all cases where I refer in the specification to less than ten carbon atoms in the carbon chain of the olefinic compound, it will be understood that a more vigorous reaction is obtained with compounds having less than seven carbon atoms in the carbon chain, and a still more vigorous reaction with compounds having less than five carbon atoms in the carbon chain. These latter groups (less than seven and less than five) are to be taken as expressly included, although not specifically mentioned because of a desire to shorten the specification.

When reference is made to the maleic grouping in condensable form, it will be understood that it is intended to designate maleic anhydride, a substance yielding maleic anhydride or a maleic ester or similar compound which is capable of condensing to enter the carbon chain of a nonconjugated unsaturated nonhydroxylated aliphatic compound having from ten to twenty-four carbon atoms in the carbon chain. A maleic condensation product may be obtained from any such compound having the maleic grouping, preferably maleic anhydride.

As will be later explained in considerable detail, the presence of the acid or acid anhydride radical in the condensation product is distinctly advantageous, because of the reactions of which the acid or acid anhydride radical is capable and the uses to which such reactions may be put.

A wide variety of nonconjugated unsaturated nonhydroxylated carbon chain compounds having from ten to twenty-four carbon atoms in the carbon chain may be employed. Esters of fatty acids with mono-, di- or poly-hydric alcohols, for example glyceryl or glycol esters, are particularly desirable. The free fatty acids may also be used. Salts of the fatty acids (soaps) may likewise be employed.

When reference is made to the length of the carbon chain as being from ten to twenty-four carbon atoms, it is intended to include compounds having ten carbon atoms, twenty-four carbon atoms or any intermediate number of carbon atoms in the chain. The reference to the length of the carbon chain applies to the carbon chain of the acid. A glyceride, for example, contains three such carbon chains united to a glyceryl group.

As examples of the type of nonconjugated unsaturated nonhydroxylated aliphatic acids having from ten to twenty-four carbon atoms in the carbon chain which I may use, I suggest oleic, linoleic, linolenic, clupanodonic and undecylenic. The esters of the nonhydroxylated fatty acids may be either glyceryl esters, which form oils such as corn, olive (triolein), cotton seed, peanut, linseed, sunflower, safflower, perilla, hemp seed, walnut seed, soya, rape seed, tomato seed, neat's foot, lard, codliver, burbet, salmon, cod, menhaden, and many others, all nonconjugated unsaturated nonhydroxylated fatty oils; or esters of other alcohols, for example glycol esters. It will furthermore be understood that mixtures of various esters, or of the esters and the free fatty acids, or of salts of the acids, may be employed if desired.

When I refer to the grouping of a nonconjugated unsaturated nonhydroxylated aliphatic acid having from ten to twenty-four carbon atoms in the carbon chain, I mean to include the acid, and compounds of the acid such as esters of the acid, whether with mono-, di- or poly-hydric-alcohols, and salts of the acid. I do not include herein hydroxylated aliphatic acids, oils, etc., because, while the condensation of my invention may in certain cases be obtained with them, special precautions must be taken because of the tendency of hydroxylated fatty acids, oils, etc., to esterify and gel. A typical hydroxylated fatty oil is castor oil. The question of whether the free acid or the ester or the salt is used is immaterial from the standpoint of the condensation reaction because the condensation reaction with the alkyl substituted olefinic compound having less than ten carbon atoms in its carbon chain appears to involve the carbon chain at an intermediate point between its ends, rather than the carboxyl group or neutralized carboxyl group at the end of the chain. Of course, the character of the product will vary depending upon whether the acid, ester or salt is used.

In the condensation, I may desirably employ one molecular equivalent of nonconjugated unsaturated nonhydroxylated acid or the like to one molecular equivalent of acyclic olefinic acid, acid anhydride or ester and subject the mixture to a temperature of between 150° C. and 300° C. and preferably also to high pressure to facilitate the reaction. Pressure may desirably be applied by simply confining the reaction components between the walls of some vessel such as a pressure autoclave and then heating the reaction components. Pressure may also be applied in any other suitable way, as by pumping the reacting components into the vessel or introducing an inert gas under pressure. I have used pressures up to 300 pounds per square inch with success. Of course the desirable pressure will vary with the individual reaction.

A suitable catalyst may be used to accelerate the reaction and to increase the yield. I do not, however, find that a catalyst is necessary.

The condensation reaction may be carried out in the presence of suitable solvents, although this is not usually necessary.

In ordinary practice I prefer not to use sufficient acyclic olefinic acid having less than ten carbon atoms in the carbon chain, or acid anhydride or ester thereof, to saturate all of the double bonds in the fatty acid or fatty oil, etc., having from ten to twenty-four carbon atoms in the carbon chain. The condensation product thus ordinarily has an iodine value. Generally it is sufficient to saturate one-sixth to one-third of the double bonds in the fatty acid, fatty oil, etc. Thus in olive oil one-third of the double bonds (one) is ordinarily saturated, and in linseed oil one-sixth (one). But in individual cases it may be desirable to satisfy more ethylene linkages in the fatty acid or fatty oil, and even to completely saturate them. To saturate all of the ethylene linkages in linseed oil, six molecular equivalents of acyclic olefinic acid having less than ten carbon atoms in the carbon chain, or acid anhydride thereof or ester thereof, are caused to react with one molecular equivalent of linseed oil.

Examples 1 to 6, given below, clearly indicate the way in which my improved condensation product is obtained:

EXAMPLE 1

In a pressure autoclave, 180 parts by weight of linseed oil are mixed with 20 parts by weight of maleic anhydride (an acyclic olefinic acid anhydride). The temperature is maintained at from 250° C. to 260° C. for one hour. The reaction may be obtained satisfactorily at 150° C., but is much slower at this low temperature, and the temperature may be raised to as much as 300° C., but the high temperature may cause some difficulty due to carbonization. After cooling the reaction product is removed from the autoclave. The condensation product is slightly darker and more viscous than the original linseed oil. It is soluble in acetone, ethyl acetate, ether, xylene, carbon tetrachloride, higher petroleum hydrocarbons and turpentine; and semi-soluble in 95% ethyl alcohol. The condensation product is miscible with fatty oils and solutions of nitrocellulose in all proportions. The iodine value is 141.4, as against 190.0 for the original linseed oil. The saponification value is 288 and the acid value is 52.9, in the presence of ethyl alcohol.

EXAMPLE 2

Into a three-neck flask, equipped with a thermometer, mechanical stirrer and reflux condenser, 200 parts by weight of distilled oleic acid and 60 parts by weight of maleic anhydride are placed and heat is applied until the temperature of the mixture reaches 180° C.

The temperature is gradually raised from 180° C. to 250° C. over a period of one hour, during which time the amount of maleic anhydride condensed by the reflux progressively diminishes. The temperature is maintained at 250° C. to 260° C. until no more maleic anhydride appears to condense under the reflux. The temperatures given are those found best for carrying out the reaction, although temperatures between 150° C. and 300° C. may be used.

The condensation product is soluble in ethyl alcohol, ether, xylene, carbon tetrachloride and solutions of nitrocellulose, but is substantially insoluble in petroleum hydrocarbons and fatty oils.

EXAMPLE 3

To 180 parts by weight of linseed oil are added 25 parts by weight of citraconic anhydride (an acyclic olefinic acid anhydride) and the mixture is heated in a three-neck flask, equipped with a reflux condenser, at about 250° C. for about three-quarters of an hour. At the end of this period, no further citraconic anhydride appears to condense under the reflux, indicating completion of the reaction. As a precaution, heating is continued for about 15 minutes longer. The reaction product is less viscous than the maleic condensation product of linseed oil obtained in Example 1, but has the same properties otherwise.

EXAMPLE 4

A mixture of 25 parts by weight of linseed oil and 2.4 parts by weight of crotonic acid (an acyclic olefinic acid) are heated under pressure at about 250° C. for about two hours. The condensation product has similar properties to the maleic-linseed oil condensation product obtained in Example 1 as respects solubility above noted, and dispersing power, drying action and adherence to metals, noted below.

EXAMPLE 5

A mixture of 25 parts by weight of linseed oil and 2.5 parts by weight of vinyl acetate (an acylic olefinic ester) are heated under pressure to about 250° C. for about two hours. The condensation product is soluble in alcohols, but substantially insoluble in petroleum hydrocarbons. This condensation product may be employed as a drying oil.

EXAMPLE 6

A mixture of 900 parts by weight of linseed oil and 112 parts by weight of acid methyl maleate (an acyclic olefinic half ester) are heated under pressure at about 250° C. for about two hours. If neutralized with an alkali, the reaction product forms an excellent dispersing agent as later explained.

My novel condensation product may be made with nonconjugated unsaturated nonhydroxylated drying, semi-drying or nondrying fatty oils having from ten to twenty-four carbon atoms in the carbon chain, or mixtures of the same, and the characteristics of the product are, to some extent, dependent upon the character of the oils or the like employed in the reaction. When nonconjugated unsaturated nonhydroxylated drying oils are caused to react with acyclic olefinic acids, having less than ten carbon atoms in their carbon chains, or said anhydrides or esters thereof, the products dry in the air at ordinary temperatures to form hard dry films whether or not driers are used. Likewise, the condensation products of nonconjugated unsaturated nonhydroxylated drying oils generaly exhibit thermo-hardening properties, being convertible at 70° C. to 80° C., for example into hard resistant varnish-like films in short periods of time. Where nonconjugated unsaturated nonhydroxylated semi-drying oils such as sunflower, soya, safflower and other similar oils are caused to react with acyclic olefinic acids having less than ten carbon atoms in their carbon chains, or acid anhydrides or esters thereof, the condensation products do not dry so readily as the condensation products obtained from the drying oils. An example of the drying behavior of the condensation product obtained by Example 1 is as follows:

EXAMPLE 7

A 1:1 xylene solution of the reaction product obtained in Example 1 to which soluble driers are added to the extent of 0.03% of cobalt, 0.05% of manganese and 0.5% of lead, for example in the form of linoleates or resinates, dries to a hard film at room temperature in about five hours and may be stoved to a hard film at 80° C. in about one and one-half hours. The film produced is not acted upon by water, ethyl alcohol, benzine, or xylene.

It is thus evident that the invention permits of the direct production of thermo-hardening and air-drying lacquers, varnishes, etc.

Without limiting myself to any exact structure for the condensation product, it would appear that the condensation product is an addition product at a double bond in the carbon chain of the nonconjugated unsaturated non-hydroxylated fatty acid or the like to the condensable acyclic olefinic compound or the like. For example, if linolenic acid reacts with maleic anhydride, the first stage in the reaction appears to be in general as follows. Of course if enough maleic anhydride be present, the same reaction will take place at each double bond in the linolenic acid.

linolenic acid

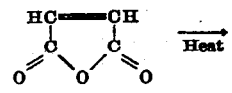 → Heat

Maleic anhydride

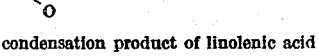
Maleic condensation product of linolenic acid

The iodine value of the condensation product confirms the above formula, and indicates that the ethylene linkage of the olefinic compound (in this case maleic anhydride) has been lost during condensation. It should be noted that one of the double bonds in linolenic acid and the ethylene linkage in maleic anhydride appears to have disappeared in the condensation product forming a ring type compound with four carbon atoms in the ring.

The condensation product appears to be characterized by the linkage:

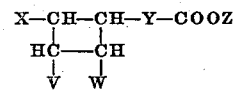

where

is one of the group consisting of acyclic acids of chain length less than ten carbon atoms, acid anhydrides thereof and esters of both, X and Y are carbon chains without conjugated double bonds, the length of the carbon chain from X to Y inclusive is between ten and twenty-four carbon atoms, and Z is one of the group consisting of hydrogen, metals and esters.

As a working hypothesis, it would seem that the structural formula which results from the reaction of the present invention may possibly be expressed in more simplified form as follows:

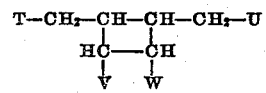

where

is one of the group consisting of acyclic acids of less than ten carbon atoms chain length, acid anhydrides thereof and esters of both, the straight carbon chain from T to U inclusive is between ten and twenty-four carbon atoms in length, T is part of the carbon chain, and the terminus grouping U is one of the group consisting of the carboxyl grouping, salts thereof and esters thereof.

The reaction above will be modified in well known manner if a glyceryl ester of linolenic acid instead of linolenic acid be used, or if some other nonconjugated unsaturated nonhydroxylated aliphatic acid having between ten and twenty-four carbon atoms in the carbon chain be employed, or if some other acyclic olefinic acid, acid anhydride, or ester having less than ten carbon atoms in its carbon chain, be used instead of or in mixture with maleic anhydride.

It should be noted that the acyclic olefinic acid or acid anhydride condensation product of linolenic acid or any similar acid has a carboxyl group capable of reacting at the end of the linolenic or other similar carbon chain, and also an olefinic acid or acid anhydride group capable of reacting. The condensation will take place notwithstanding that both of these groups have been esterified before the condensation reaction, but the presence of the unesterified polar-reactive groups is of great advantage for many purposes as later explained.

When maleic acid is condensed with a nonconjugated unsaturated nonhydroxylated fatty acid or the like, it appears to change to maleic anhydride and the maleic anhydride condensation product results.

Recondensation

The condensation reaction between an acyclic olefinic acid, acid anhydride, or ester having less than ten carbon atoms in the carbon chain, and a nonconjugated unsaturated nonhydroxylated aliphatic acid or the like having from ten to twenty-four carbon atoms in its carbon chain has been described in general.

It is possible to recondense the acyclic olefinic condensation product of a nonconjugated unsaturated nonhydroxylated aliphatic acid or the like to produce more complex recondensed products. For example, the condensation product of an acyclic olefinic compound having less than ten carbon atoms in the carbon chain and a nonconjugated unsaturated nonhydroxylated aliphatic acid or the like having from ten to twenty-four carbon atoms in its carbon chain may be condensed with a phenol, either with or without a condensing agent such as hexamethylenetetramine. Likewise, the maleic condensation or similar condensation may be brought about in the presence of a phenol and aldehyde, with or without a condensing agent such as hexamethylenetetramine. As is well known, phenols and aldehydes themselves possess a tendency to condense, and, when the acyclic olefinic condensation product of a nonconjugated unsaturated nonhydroxylated aliphatic acid or the like is present, a complex recondensation takes place between the acyclic olefinic condensation product, the phenol and the aldehyde. Recondensation proceeds more satisfactorily when the alkyl substituted acyclic olefinic compound is an acid or acid anhydride.

On the other hand, other reactive resin-forming or resinifying substances may be used to replace part of the acyclic olefinic condensation product in the recondensation. For example, a mixture of the maleic condensation product of a nonconjugated unsaturated nonhydroxylated aliphatic acid or the like having from ten to twenty-four carbon atoms in its carbon chain with benzoyl benzoic acid (or other reactive resinifying or resin-forming substances) may be condensed with a phenol or a mixture of a phenol and an aldehyde, with or without the assistance of a condensing agent such as hexamethylenetetramine.

The recondensation product obtained by using the acyclic olefinic condensation product of a nonconjugated unsaturated nonhydroxylated aliphatic acid or the like having from ten to twenty-four carbon atoms in its carbon chain and some other substance or substances capable of undergoing condensation is so complex that even an approximate statement of its structure at the present time is not to be attempted. For the purpose of illustration, however, I give a specific example of a relatively simple recondensation, with knowledge that persons skilled in the art can readily devise other recondensations to suit particular needs.

EXAMPLE 8

In this example 70 parts by weight of the viscous oil obtained by the interaction of maleic anhydride and linseed oil, as described for instance in Example 1, are mixed with 46 parts by weight of a commercially procurable mixture of xylenols (higher phenols) and 14 parts by weight of hexamethylenetetramine. The mixture is slowly heated to 150° C., at which temperature a vigorous reaction begins. After the reaction has subsided, the temperature is raised to 200° C., at which point another reaction starts with rapid increase in viscosity of the reaction product. The temperature is held at 200° C. until the mass becomes almost solid.

The recondensation product is a resinous mass, soluble in xylene, which, in the presence of metallic driers, may be stoved to give a hard film, for example at 80° C. The reaction as described above may be carried out with a great variety of the substances of the types given, and with various quantities and conditions, the change of which is within the skill of a routine experimenter.

Acid or acid anhydride reactions

As noted above, an acid or acid anhydride group of the condensation product is capable of a wide variety of reactions to produce desirable products of various kinds. For example, very satisfactory oil-soluble driers may be manufactured by causing the condensation product of an acyclic olefinic acid or acid anhydride having less than ten carbon atoms in the carbon chain and a nonconjugated unsaturated nonhydroxylated aliphatic acid or the like having from ten to twenty-four carbon atoms in the carbon chain, particularly a glyceride of such acid, to react with a metallic oxide, hydroxide, carbonate or other similar compound capable of combination with the acid or acid anhydride group of the acyclic olefinic acid or acid anhydride condensation product. For example, the oxides, hydroxides and carbonates and acetates in the presence of water, and many other salts of lead, cobalt or manganese can be caused to react with the maleic condensation product of linseed oil as described in Example 1, to form driers which are readily soluble in linseed oil and very useful in the paint, varnish and lacquer industry.

A desirable feature of my invention is that the condensation product of acyclic olefinic acids and acid anhydrides having less than ten carbon atoms in the carbon chain, with nonconjugated unsaturated nonhydroxylated drying oils forms an excellent vehicle or ingredient for a vehicle for paints, etc. This reacts with metallic oxides and hydroxides, and with carbonates and acetates in the presence of water, to form a drier which is chemically combined with the vehicle. Such a drier is made by adding a small percentage of lead oxide to the maleic anhydride condensation product of linseed oil (for example, enough to introduce ½% of lead into the condensation product).

Esterification of the acid or acid anhydride group is frequently desirable. The alcohol used may be either aliphatic or aromatic and either mono-, di- or poly-hydric. Of course, the carbon atoms in the group added by esterification are not counted as part of the carbon chain of the acid or acid anhydride used in making the condensation product.

The esterified condensation product in which the maleic grouping or similar grouping has combined with the grouping of a nonconjugated unsaturated nonhydroxylated fatty drying oil exhibits the same desirable air-drying and thermohardening properties as the unesterified condensation product, and may be used for paint, varnish and lacquer work with success.

EXAMPLE 9

A typical case of esterification is exhibited when 25 parts by weight of the viscous oil obtained by the interaction of maleic anhydride and linseed oil, as described for instance in Example 1, are mixed with 1.6 parts by weight of ethylene glycol and the mixture is maintained at about 180° C. until the reaction ceases. A 1:1 xylene solution of the reaction product, when treated with a suitable quantity of metallic driers, as described for instance in Example 7, dries at room temperature to a hard film in a somewhat shorter time than that required for linseed oil and, when stoved at 80° C., gives a hard film in about one and one-half hours. The film is not attacked by water, alcohol or xylene.

In the above reaction the ethylene glycol neutralizes the acid anhydride and forms an ester. Of course, if the starting material is the condensation product of linolenic acid instead of its glyceride, esterification takes place at the carboxyl group as well as at the acid anhydride group, as the condensation product is then polar-reactive at two distinct parts of the molecule.

The polar-reactive quality of the acid or acid anhydride in an acyclic olefinic acid or acid anhydride having less than ten carbon atoms in the carbon chain is of great importance when its condensation product with a nonconjugated unsaturated nonhydroxylated aliphatic acid or the like having from ten to twenty-four carbon atoms in its carbon chain is used as a metal coating. In this instance the acid or acid anhydride group acts upon the metal which is coated and produces very tenacious adherence of the film. This makes the acyclic olefinic acid or acid anhydride condensation product of a nonconjugated unsaturated nonhydroxylated aliphatic acid or oil or the like having from ten to twenty-four carbon atoms in its carbon chain very desirable as a base or priming coat. The suitability of the acyclic olefinic condensation product of a nonconjugated unsaturated nonhydroxylated acid or the like for priming or base coat purposes is increased when nitrocellulose lacquers are employed for a subsequent coat or coats, because nitrocellulose solutions (for example, nitrocellulose dissolved in ethyl alcohol and ethyl acetate) are completely miscible with the acyclic olefinic condensation product and firm adherence between the condensation product coat and the nitrocellulose coat or coats is thus obtained. The advantage of the condensation product as a base for nitrocellulose is present whether the acyclic olefinic compound be an acid or acid anhydride, or whether it be an ester, or half ester. It will be understood, however, that the subsequent coats need not be nitrocellulose, but may comprise other paints or lacquers, such as acyclic olefinic condensation product paints or lacquers, or paints or lacquers based upon drying oils or mixtures of these.

EXAMPLE 10

To 10 parts by weight of the viscous oil obtained by the interaction of linseed oil and maleic anhydride, as described for instance in Example 1, soluble driers are added to the extent of about 0.03% cobalt, 0.05% manganese, and 0.5% lead in the form of linoleates or resinates. One half of a polished zinc plate is coated with a 1:1 xylene solution of the product just described and the film is stoved at 80° C. for one and one-half hours.

The film adheres very tenaciously to the metallic surface, and, if the film is removed by boiling acetone, the surface to which the film was attached shows a decided etching effect while the surface of the zinc which was not coated is unaffected. The etching effect appears to be due to the action of the acid anhydride radical in the maleic condensation product of linseed oil on the zinc.

Application of a film of nitrocellulose lacquer to the film of the maleic condensation product of linseed oil results in excellent adherence of the nitrocellulose film to the maleic condensation product film and of the maleic condensation product film to the metal.

The property of firm adherence to metal surfaces is exhibited with all of the ordinary structural and coating metals, such as zinc, tin, lead, copper, iron, aluminum, chromium, nickel, cadmium, etc. and their various alloys, such as steel, nichrome, brass, bronze, etc. The maleic anhydride condensation product of linseed oil dries much more quickly on copper than linseed oil, probably because the copper salt of the condensation product acts as a drier. Adherence to the copper is extremely firm.

My novel condensation product is very satisfactory for use with nitrocellulose solutions in lacquers, etc. The proportions need not be restricted, although I have found that 20% to 50% of nitrocellulose solution and 80% to 50% of condensed drying oil make a suitable vehicle. The polar-reactive groups in the condensed drying oil give firm adherence.

I have observed that the condensation product of an acyclic olefinic acid or acid anhydride having less than ten carbon atoms in the carbon chain and a nonconjugated unsaturated nonhydroxylated drying oil adheres very firmly to wood and leather, doubtless due to the presence of the polar-reactive group. I therefore recommend this product as an improved paint vehicle, or patent leather coating substance.

A very desirable feature of my invention is the ability to produce dispersing agents for dispersing solids and emulsifying liquids. I have discovered that such a desirable dispersing agent may be obtained by producing a salt, acid salt or salt-ester of the condensation product of an acyclic olefinic acid or acid anhydride having less than ten carbon atoms in the carbon chain, and a nonconjugated unsaturated nonhydroxylated fatty acid or the like having from ten to twenty-four carbon atoms in its carbon chain. For dispersing purposes the salt-ester of the maleic condensation product of a nonconjugated unsaturated nonhydroxylated non-drying fatty oil is preferable.

Using the maleic anhydride condensation product of a nonconjugated unsaturated nonhydroxylated fatty oil having from ten to twenty-four carbon atoms in its carbon chain as an example, I have found that the completed salt, in which the maleic grouping is combined with carboxyl groups neutralized by an alkali metal base, for instance potassium or sodium hydroxide, or an organic base such as triethylamine, is a satisfactory dispersing agent. The acid salt, in which one carboxyl group is not neutralized and another is neutralized by an alkali metal base or organic base, is likewise a satisfactory dispersing agent. Also, the salt-ester obtained by neutralizing the acid ester, is satisfactory. The completed ester is not a good dispersing agent. The above facts apply also to the various other acyclic olefinic acid or acid anhydride condensation products described herein.

Whenever I refer in the claims to a salt in the present connection I mean to include a completed salt, an acid salt and a salt-ester. The base used in forming the soluble salt may be an alkali metal base or an organic base.

In producing my desirable dispersing agent, I preferably esterify the maleic condensation product with the theoretical quantity of an aliphatic or aromatic alcohol to produce an acid ester and then neutralize the acid ester with a suitable base or alkali to form a salt-ester. The resultant product is a water-soluble oil which may be mixed with other oils to produce an emulsion. Emulsions made in this way have been found to be very stable and very nearly neutral. Such oil emulsions may be used to advantage instead of sulphonated oil emulsions because the stability, wettability, solubility and dispersive power of the dispersing agent obtained by my invention is greater than in the case of sulphonated oils. Emulsions produced by my dispersing agents have the further advantage over sulphonated oil emulsions that they are not decomposed, and particularly do not liberate an acid group as do the sulphonated oils, which liberate sulphuric acid upon decomposition.

Large quantities of sulphonated oils are now used for dispersing, wetting and softening agents in the textile, leather, paper, plaster and cement industries. My improved product is according to tests by me superior to the commonly used sulphonated oils for use as a dispersing, wetting and softening agent in these and other industries. In the textile field, my product may be used in delustering rayon, for example.

Using my novel dispersing agents, I have produced very satisfactory dispersions of carnauba wax in water, of petroleum hydrocarbons in water and of many vegetable oils, such as linseed, olive, neat's foot, castor, etc., in water.

My new dispersing agent is very desirable as a bodying agent in the making of polishes, cutting fluids and cosmetics. There are of course many other uses too numerous to mention.

Example 11

To 50 parts by weight of the viscous oil obtained by the interaction of maleic anhydride and olive oil under conditions similar to those described for instance in Example 1 (1 molecular equivalent of maleic anhydride to 1 molecular equivalent of olive oil), are added 5 parts by weight of isoamyl alcohol and the ingredients are refluxed for one-half hour. Any suitable alcohol may be used for this esterification, although the quantity of alcohol used will of course depend upon the particular alcohol. The reaction produces an acid ester.

The product is neutralized with the theoretical amount of a base, preferably sodium or potassium hydroxide in concentrated aqueous solution. The resultant oily salt-ester is miscible with water in all proportions and is likewise miscible in all proportions with fatty oils and petroleum hydrocarbons.

The salt-ester as prepared above may be added to any suitable fatty oil or petroleum hydrocarbon to produce dispersion.

The acid ester may be added to the disperse phase before neutralization, and neutralization may be accomplished in the presence of the disperse phase.

Example 12

To a water-insoluble hydrocarbon, alcohol, or fatty oil, such as olive oil, castor oil, etc., the salt-ester of a nonconjugated unsaturated nonhydroxylated fatty oil condensation product as prepared in Example 11 is added until the salt-ester forms 20% of the mixture. This mixture is readily emulsified with water due to the presence of water-soluble salt-ester, and will remain in suspension over an indefinitely long period of time.

If the water-soluble oil as obtained in Example 12 is boiled with water for one to five hours, the product is not decomposed with the concomitant separation of oil.

The emulsion of olive oil dispersed by the water-soluble oil as obtained in Example 12 is very satisfactory as a wetting and softening agent for the textile, leather and paper industries.

It will be evident that a desirable dispersing agent containing a suitably neutralized acidic group or suitably neutralized and partly esterified acidic group may be produced by oxidizing the condensation product of an acyclic olefinic alcohol or aldehyde having less than ten carbon atoms in its carbon chain and a nonconjugated unsaturated nonhydroxylated aliphatic acid having from ten to twenty-four carbon atoms in the carbon chain or an ester or salt thereof. Likewise, an ester of the condensation product may be hydrolyzed or partially hydrolyzed and then neutralized to produce a dispersing agent.

Paint

My improved oil, as obtained for example by condensing an acyclic olefinic acid, acid anhydride, or ester, having less than ten carbon atoms in the carbon chain, with a fatty drying oil such as linseed oil has greatly improved wettability for pigments. This exhibits itself in a number of ways. The time required for complete mixing with a pigment such as zinc oxide is much reduced. It is also much easier to grind the pigment with my improved oil. The paint produced by the use of my oil as a vehicle has very remarkable "leveling" properties, which make it superior to other paints in which the vehicle is not condensed.

It will immediately be evident to persons familiar with the art that the disclosure of the present invention is of wide utility in a number of diversified industries, as it provides a means of altering the properties of any one of a wide variety of commercially used oils to fit them to several new needs. For example, it is possible to obtain greatly increased viscosity.

I can increase the wettability of oils to pigments, with consequent improvement in the mixing, grinding and "leveling" properties. It is also possible to increase tremendously the property of a film of firm adherence to metal and of firm adherence to special lacquer films which are subsequently applied. It is also possible to render the product soluble in water and to produce stable dispersions.

I believe that I am the first to discover that acyclic olefinic acids, acid anhydrides and esters having less than ten carbon atoms in the carbon chain, preferably less than seven carbon atoms in the carbon chain and still better less than five carbon atoms in the carbon chain, will condense with the carbon chain of a nonconjugated unsaturated nonhydroxylated aliphatic acid, ester, salt, etc. having from ten to twenty-four carbon atoms in the carbon chain. I frequently refer to such nonconjugated unsaturated aliphatic acids, esters, salts, etc., as nonconjugated unsaturated nonhydroxylated fatty acid compounds, or compounds having the fatty acid grouping. It is of course within the ability of any routine chemist to suggest other analogous compounds which may be used without departing from my invention, such as neutralized acyclic olefinic half esters, etc., which are to be regarded as equivalents of the compounds mentioned. For different compounds, some variations in desirable reaction temperatures and pressures will be found.

Wherever I refer herein to resin-forming substances I mean to include resinifying substances also, and when I refer to resinifying substances, I likewise mean to include resin-forming substances.

Throughout the specification and claims, where I refer to nonconjugated unsaturated nonhydroxylated aliphatic acids having from ten to twenty-four carbon atoms in the carbon chains, or salts or esters thereof, I mean such acids, salts or esters as are unoxidized or nonpolymerized or not sufficiently oxidized or polymerized to interfere with the reactions disclosed herein. Thus, in referring to linseed oil, I mean the product generally known as such, raw or refined, and not linseed oil sufficiently oxidized or polymerized to prevent or seriously interfere with the formation of a condensation product at a double bond. In other words, I do not intend to exclude others from mere esterification of oxidized or polymerized fatty oils by some acidic substance, such as maleic anhydride.

Many of the fish oils contain varying percentages of fatty alcohols, which will of course react with a substance of the type of maleic anhydride to form esters. The esterified fatty alcohols may be allowed to remain in the condensation product, or the alcohols may be removed before condensation takes place.

It will be evident that the condensation product of my invention may be oxidized subsequent to condensation.

In view of my invention and disclosure variations and modifications to meet individual whim or particular need will doubtless become evident to others skilled in the art, to obtain all or part of the benefits of my invention without copying the process or product disclosed, and I, therefore, claim all such in so far as they fall within the reasonable spirit and scope of my invention.

Having thus described my invention, what I claim as new and desire to secure by Letters Patent is:

1. The process of forming a condensation product suitable for use in resins, lacquers, paints, varnishes, enamels, metallic coatings, plastic masses, dispersing, wetting and softening agents, and the like, which comprises reacting one of the first group consisting of acyclic olefinic acids having less than ten carbon atoms in their carbon chains, acid anhydrides thereof and esters of both, at the olefinic linkage of one of the second group consisting of non conjugated unsaturated nonhydroxylated aliphatic acids having from ten to twenty-four carbon atoms in their carbon chains, nonhydroxylated salts and nonhydroxylated esters thereof, at a temperature in excess of 150° C. and continuing the heating until a substantial quantity of the one of the first-group is combined at an intermediate point in the carbon chain of the one of the second group.

2. The process of forming a condensation product, which comprises reacting one of the first group consisting of acyclic olefinic acids having less than ten carbon atoms in their carbon chains, acid anhydrides thereof and esters of both, with one of the second group consisting of nonconjugated unsaturated nonhydroxylated aliphatic acids having from ten to twenty-four carbon atoms in their carbon chains, nonhydroxylated salts and nonhydroxylated esters thereof, at a double bond of the one of the second group, in proportions which saturate less than all of the double bonds in said one of the second group and at a temperature in excess of 150° C. and continuing the heating until a substantial quantity of the one of the first group is combined at an intermediate point in the carbon chain of the one of the second group.

3. The process of forming a condensation product, which comprises causing one of the first group consisting of acyclic olefinic acids having less than ten carbon atoms in their carbon chains, acid anhydrides thereof and esters of both, to react with one of the second group consisting of nonconjugated nonhydroxylated aliphatic acids having from ten to twenty-four carbon atoms in their carbon chains, nonhydroxylated salts and nonhydroxylated esters thereof, at a double bond of the one of the second group at a temperature of 150° C. and continuing the heating until about one molecular equivalent of the one of the first group is combined at an intermediate point in the carbon chain of one molecular equivalent of the one of the second group.

4. The process of forming a condensation product, which comprises heating a mixture of one of the first group consisting of acyclic olefinic acids having less than ten carbon atoms in their carbon chains, acid anhydrides thereof and esters of both, with one of the second group consisting of nonconjugated unsaturated nonhydroxylated aliphatic acids having from ten to twenty-four carbon atoms in their carbon chains, nonhydroxylated salts and nonhydroxylated esters thereof, to a temperature between 150° C. and 300° C. and continuing the heating until a substantial quantity of the one of the first group is combined at an intermediate point in the carbon chain of the one of the second group in the presence of no substantial excess of the one of the first group over the quantity necessary to saturate all double bonds in the one of the second group.

5. The process of making a condensation product, which comprises applying heat and pressure above atmospheric to a mixture of one of the first group consisting of acyclic olefinic acids having less than ten carbon atoms in their carbon chains, acid anhydrides thereof and esters of both, with one of the second group consisting of nonconjugated unsaturated nonhydroxylated aliphatic acids having from ten to twenty-four carbon atoms in their carbon chains, nonhydroxylated salts and nonhydroxylated esters thereof, at a temperature in excess of 150° C. and continuing the heating until a substantial quantity of the one of the first group is combined at an intermediate point in the carbon chain of the one of the second group, in the presence of no substantial excess of the one of the first group over the quantity necessary to saturate all double bonds in the one of the second group.

6. The process of forming a condensation product, which comprises heating a mixture of one of the first group consisting of acyclic olefinic acids having less than ten carbon atoms in their carbon chains, acid anhydrides thereof and esters of both, with one of the second group consisting of nonconjugated unsaturated nonhydroxylated aliphatic acids having from ten to twenty-four carbon atoms in their carbon chains, nonhydroxylated salts and nonhydroxylated esters thereof, to a temperature between 150° C. and 300° C. and continuing the heating until a substantial quantity of the one of the first group is combined at an intermediate point in the carbon chain of the one of the second group in the presence of no substantial excess of the one of the first group over the quantity necessary to saturate all double bonds in one of the second group and simultaneously confining the reacting compounds within closed walls of a reaction vessel to apply pressure.

7. The process of forming a condensation product, which comprises reacting one of the group consisting of acyclic olefinic acids having less than ten carbon atoms in their carbon chains, acid anhydrides thereof and esters of both, with a nonconjugated unsaturated nonhydroxylated drying oil at a temperature in excess of 150° C. and continuing the heating until a substantial quantity of the one of the group is combined at an intermediate point in the carbon chain of the drying oil fatty acid.

8. The process of forming a condensation product, which comprises reacting one of the group consisting of acyclic olefinic acids having less than ten carbon atoms in their carbon chains, acid anhydrides thereof and esters of both, with a nonconjugated unsaturated nonhydroxylated glyceride oil at a temperature not less than 150° C. and in excess of the ordinary boiling point of the one of the group, with return condensation and for a time sufficient to produce a substantial amount of the condensation product.

9. The process of forming a condensation product, which comprises reacting crotonic acid with linseed oil at a temperature in excess of 150° C. and continuing the heating until a substantial quantity of crotonic acid is combined at an intermediate point in the carbon chain of the linseed oil fatty acid.

10. The process of forming a condensation product, which comprises reacting an acyclic olefinic acid having less than ten carbon atoms in the carbon chain with the carbon chain of a nonconjugated unsaturated nonhydroxylated fatty oil having from ten to twenty-four carbon atoms in the carbon chain at a temperature above 150° C. in the presence of not substantially more than enough of the olefinic acid to saturate the fatty oil and continuing the heating until a substantial quantity of the olefinic acid is combined at an intermediate point in the carbon chain of the fatty acid of the fatty oil.

11. The process of forming a condensation product, which comprises reacting the ester of an acyclic olefinic acid having less than ten carbon atoms in the carbon chain with the carbon chain of a nonconjugated unsaturated nonhydroxylated fatty oil having from ten to twenty-four carbon atoms in the carbon chain at a temperature above 150° C. in the presence of not substantially more than enough of the olefinic ester to saturate the fatty oil and continuing the heating until a substantial quantity of the ester is combined at an intermediate point in the carbon chain of the fatty acid of the fatty oil.

12. The process of forming a condensation product, which comprises reacting a polar-reactive compound of the first group consisting of acyclic olefinic acids having less than ten carbon atoms in their carbon chains, acid anhydrides thereof and esters of both, with an unsaturated linkage of one of the second group consisting of nonconjugated unsaturated nonhydroxylated aliphatic acids having from ten to twenty-four carbon atoms in their carbon chains, nonhydroxylated salts and nonhydroxylated esters thereof, at a temperature in excess of 150° C. and continuing the heating until a substantial quantity of the one of the first group is combined at an intermediate point in the carbon chain of the one of the second group, while maintaining the polar-reactive property of the one of the first group, whereby the polar-reactive property of the condensation product may be usefully employed.

13. The process of forming a condensation product, which comprises reacting one of the first group consisting of acyclic olefinic acids having less than ten carbon atoms in their carbon chains, acid anhydrides thereof and esters of both, with one of the second group consisting of nonconjugated unsaturated nonhydroxylated aliphatic acids having from ten to twenty-four carbon atoms in their carbon chains, nonhydroxylated salts, and nonhydoxylated esters thereof, at a temperature not less than 150° C. and in excess of the ordinary boiling point of the one of the first group with return condensation and for a time sufficient to produce a substantial amount of the condensation product.

14. The process of forming a condensation product, which comprises reacting one of the first group consisting of acyclic olefinic acids having less than ten carbon atoms in their carbon chains, acid anhydrides thereof and esters of both, with one of the second group consisting of nonconjugated unsaturated nonhydroxylated aliphatic acids having from ten to twenty-four carbon atoms in their carbon chains, nonhydroxylated salts and nonhydroxylated esters thereof, at a temperature not less than 150° C. and in excess of the ordinary boiling point of the one of the first group with return condensation and for a time sufficient to produce a substantial amount of the condensation product, in the presence of no substantial excess of the acyclic olefinic acid compound over the quantity necessary to saturate all double bonds in the one of the second group.

15. The process of forming a condensation product, which comprises reacting one of the first group consisting of acyclic olefinic acids having less than ten carbon atoms in their carbon chains, acid anhydrides thereof and esters of both, with one of the second group consisting of nonconjugated unsaturated nonhydroxylated aliphatic acids having from ten to twenty-four carbon atoms in their carbon chains, nonhydroxylated salts and nonhydroxylated esters thereof, at a temperature not less than 150° C. and in excess of the ordinary boiling point of the one of the first group with return condensation and for a time sufficient to produce a substantial amount of the condensation product, in proportions which saturate less than all of the double bonds in said one of the second group.

16. The process of forming a condensation product, which comprises reacting an acyclic olefinic acid having less than ten carbon atoms in its carbon chain with one of the group consisting of nonconjugated unsaturated nonhydroxylated aliphatic acids having from ten to twenty-four carbon atoms in their carbon chains, nonhydroxylated salts and nonhydroxylated esters thereof, at a temperature not less than 150° C. and in excess of the ordinary boiling point of the acyclic olefinic acid with return condensation and for a time sufficient to produce a substantial amount of the condensation product.

17. The process of forming a condensation product, which comprises reacting one of the group consisting of acyclic olefinic acids having less than ten carbon atoms in their carbon chains, acid anhydrides thereof and esters of both, with a nonconjugated unsaturated nonhydroxylated fatty oil having from ten to twenty-four carbon atoms in the carbon chains of the fatty acids of the oil, at a temperature not less than 150° C. and in excess of the ordinary boiling point of the one of the group with return condensation and for a time sufficient to produce a substantial amount of the condensation product.

18. The process of forming a condensation product, which comprises reacting one of the group consisting of acyclic olefinic acids having less than ten carbon atoms in their carbon chains, acid anhydrides thereof and esters of both, with linseed oil at a temperature not less than 150° C. and in excess of the ordinary boiling point of the acyclic olefinic acid compound with return condensation and for a time sufficient to produce a substantial amount of the condensation product.

19. The process of forming a condensation product which comprises reacting crotonic acid with linseed oil at a temperature not less than 150° C. and in excess of the ordinary boiling point of crotonic acid with return condensation and for a time sufficient to produce a substantial amount of the condensation product.

20. A condensation product comprising one of the first group consisting of acyclic olefinic acids having less than ten carbon atoms in their carbon chains, acid anhydrides thereof and esters of both, combined at an unsaturated linkage with one of the second group consisting of nonconjugated unsaturated nonhydroxylated aliphatic acids having from ten to twenty-four carbon atoms in their carbon chains, nonhydroxylated salts and nonhydroxylated esters thereof, by heating at a temperature in excess of 150° C. and continuing the heating until a substantial quantity of the one of the first group is combined at an intermediate point in the carbon chain of the one of the second group.

21. A condensation product comprising one of the first group consisting of acyclic olefinic acids having less than ten carbon atoms in their carbon chains, acid anhydrides thereof and esters of both, combined at an unsaturated linkage with one of the second group consisting of nonconjugated unsaturated nonhydroxylated aliphatic acids having from ten to twenty-four carbon atoms in their carbon chains, nonhydroxylated salts and nonhydroxylated esters thereof, by heating to a temperature of between 150° C. and 300° C. and continuing the heating until a substantial quantity of the one of the first group is combined at an intermediate point in the carbon chain of the one of the second group, in the proportions of one molecular equivalent of said one of the first group to one molecular equivalent of said one of the second group.

22. A condensation product comprising one of the first group consisting of acyclic olefinic acids having less than ten carbon atoms in their carbon chains, acid anhydrides thereof and esters of both, combined at an unsaturated linkage with one of the second group consisting of nonconjugated unsaturated nonhydroxylated aliphatic acids having from ten to twenty-four carbon atoms in their carbon chains, nonhydroxylated salts and nonhydroxylated esters thereof, by heating to a temperature of between 150° C. and 300° C. and continuing the heating until a substantial quantity of the one of the first group is combined at an intermediate point in the carbon chain of the one of the second group in proportions to completely saturate the double bonds in said nonconjugated unsaturated nonhydroxylated aliphatic compound.

23. A condensation product comprising one of the first group consisting of acyclic olefinic acids having less than ten carbon atoms in their carbon chains, acid anhydrides thereof and esters of both, combined at a point or points of unsaturation with one of the second group consisting of nonconjugated unsaturated nonhydroxylated aliphatic acids having from ten to twenty-four carbon atoms in their carbon chains, nonhydroxylated salts and nonhydroxylated esters thereof, by heating to a temperature of between 150° C. and 300° C. and continuing the heating until a substantial quantity of the one of the first group is combined at an intermediate point in the carbon chain of the one of the second group, in proportions which saturate less than all of the bonds of unsaturation in said nonconjugated unsaturated nonhydroxylated aliphatic compound.

24. A condensation product comprising the product of reaction of one of the group consisting of acyclic olefinic acids having less than ten carbon atoms in their carbon chains, acid anhydrides thereof and esters of both, with a nonconjugated unsaturated nonhydroxylated drying oil combined at a point of unsaturation in the oil, by heating at a temperature in excess of 150° C. and continuing the heating until a substantial quantity of the one of the group is combined at an intermediate point in the carbon chain of the drying oil fatty acid, in the proportions of not substantially more than enough of the one of the group to saturate the oil.

25. A condensation product comprising the product of reaction of one of the group consisting of acyclic olefinic acids having less than ten carbon atoms in their carbon chains, acid anhydrides thereof and esters of both, with a nonconjugated unsaturated nonhydroxylated glyceride oil, at a temperature not less than 150° C. and in excess of the ordinary boiling point of the one of the group with return condensation and for a time sufficient to produce a substantial amount of the condensation product, and in the proportions of not substantially more than enough of the one of the group to saturate the oil.

26. A condensation product comprising a product of reaction at a double bond in the oil of an acyclic olefinic acid having less than ten carbon atoms in the carbon chain and linseed oil in the proportions of not substantially more than enough of the acid to saturate the oil.

27. A condensation product comprising the product of reaction at a double bond in the oil of an ester of an acyclic olefinic acid having less than ten carbon atoms in the carbon chain and linseed oil reacted together at a temperature not less than 150° C. and in excess of the ordinary boiling point of the olefinic ester with return condensation and for a time sufficient to produce a substantial amount of the condensation product.

28. A condensation product comprising a product of reaction of one of the first group consisting of acyclic olefinic acids having less than ten carbon atoms in their carbon chains, acid anhydrides thereof and esters of both, with one of the second group consisting of nonconjugated unsaturated nonhydroxylated aliphatic acids having from ten to twenty-four carbon atoms in their carbon chains, nonhydroxylated salts and nonhydroxylated esters thereof, at a temperature not less than 150° C. and in excess of the ordinary boiling point of the one of the first group with return condensation and for a time sufficient to produce a substantial amount of the condensation product.

29. A condensation product comprising a product of reaction of one of the first group consisting of acyclic olefinic acids having less than ten carbon atoms in their carbon chains, acid anhydrides thereof and esters of both, with one of the second group consisting of nonconjugated unsaturated nonhydroxylated aliphatic acids having from ten to twenty-four carbon atoms in their carbon chains, nonhydroxylated salts and nonhydroxylated esters thereof, at a temperature not less than 150° C. and in excess of the ordinary boiling point of the one of the first group with return condensation and for a time sufficient to produce a substantial amount of the condensation product, in the presence of no substantial excess of the acyclic olefinic acid compound over the quantity necessary to saturate all double bonds in the one of the second group.

30. A condensation product comprising a product of reaction of one of the first group consisting of acyclic olefinic acids having less than ten carbon atoms in their carbon chains, acid anhydrides thereof and esters of both, with one of the second group consisting of nonconjugated unsaturated nonhydroxylated aliphatic acids having from ten to twenty-four carbon atoms in their carbon chains, nonhydroxylated salts and nonhydroxylated esters thereof, at a temperature not less than 150° C. and in excess of the ordinary boiling point of the one of the first group with return condensation and for a time sufficient to produce a substantial amount of the condensation product, and in proportions which saturate less than all of the double bonds in the one of the second group.

31. A condensation product comprising a product of reaction of one of the group consisting of acyclic olefinic acids having less than ten carbon atoms in their carbon chains, acid anhydrides thereof and esters of both, with a nonconjugated unsaturated nonhydroxylated fatty oil having from ten to twenty-four carbon atoms in the carbon chains of the fatty acids of the oil, at a temperature not less than 150° C. and in excess of the ordinary boiling point of the one of the group with return condensation and for a time sufficient to produce a substantial amount of the condensation product, the reaction taking place at a point of unsaturation in the oil.

32. A condensation product comprising a product of reaction of one of the group consisting of acyclic olefinic acids having less than ten carbon atoms in their carbon chains, acid anhydrides thereof and esters of both, with linseed oil at a temperature not less than 150° C. and in excess of the ordinary boiling point of the one of the group with return condensation and for a time sufficient to produce a substantial amount of the condensation product, the reaction taking place at a point of unsaturation in the oil and in the proportions of not substantially more than enough of the one of the group to saturate the oil.

33. A condensation product characterized by the typical formula

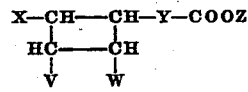

where

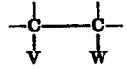

is one of the first group consisting of acyclic acids having less than ten carbon atoms in their carbon chains, acid anhydrides thereof and esters of both, X and Y are carbon chains without conjugated double bonds, the length of the carbon chain from X to Y inclusive is between ten and twenty-four carbon atoms, and Z is one of the second group consisting of hydrogen, metals and esters.

34. A condensation product characterized by the typical formula

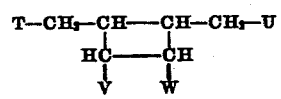

where

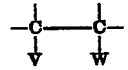

is one of the first group consisting of acyclic acids having less than ten carbon atoms in their carbon chains, acid anhydrides thereof and esters of both, the straight carbon chain from T to U is between ten and twenty-four carbon atoms in length, T is part of the carbon chain, and the terminus grouping U is one of the second group consisting of the carboxyl grouping, salts thereof and esters thereof.

EDWIN T. CLOCKER.